(12) United States Patent
Delage et al.

(10) Patent No.: US 7,069,725 B2
(45) Date of Patent: Jul. 4, 2006

(54) ELECTRO-HYDRAULIC BRAKE CIRCUIT FOR A VEHICLE

(75) Inventors: Jean-Pierre Delage, Saint Mande (FR); Philippe Bourlon, Dammartin en Goele (FR); Jean-Louis Penigault, Paris (FR); Omar Brahmi, Saint Martin du Tertre (FR)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 10/499,895

(22) PCT Filed: Dec. 24, 2002

(86) PCT No.: PCT/FR02/04553

§ 371 (c)(1),
(2), (4) Date: Jun. 23, 2004

(87) PCT Pub. No.: WO03/059711

PCT Pub. Date: Jul. 24, 2003

(65) Prior Publication Data

US 2005/0076640 A1 Apr. 14, 2005

(30) Foreign Application Priority Data

Dec. 31, 2001 (FR) .................................. 01 17121

(51) Int. Cl.
*B60T 17/00* (2006.01)
(52) U.S. Cl. ....................................................... 60/566
(58) Field of Classification Search ................. 60/566, 60/588
See application file for complete search history.

(56) References Cited

U.S. PATENT DOCUMENTS

| | | | |
|---|---|---|---|
| 6,192,685 B1* | 2/2001 | Bourlon et al. | 60/566 |
| 6,547,342 B1* | 4/2003 | Schaust et al. | 303/114.1 |
| 6,746,088 B1* | 6/2004 | Chris | 303/114.1 |
| 6,789,857 B1* | 9/2004 | Kusano | 303/114.1 |
| 6,808,238 B1* | 10/2004 | Drott et al. | 303/114.1 |

* cited by examiner

*Primary Examiner*—Edward K. Look
*Assistant Examiner*—Michael Leslie
(74) *Attorney, Agent, or Firm*—Leo H McCormick, Jr.; Sarah Taylor; Warren Comstock

(57) ABSTRACT

When an element of the electro-hydraulic brake circuit (1) is malfunctioning, a master cylinder (2) can brake the vehicle. A brake actuation simulator (8) is then disconnected from the master cylinder (2) by means of an O-ring gasket (22) after the gasket has been compressed between a groove (16) in a secondary piston (11) and a bore (24) in the master cylinder. In order to prevent the gasket from being extruded from the groove during brake release (or brake pedal release) resulting from sudden braking, the invention makes provision for a pressure relief duct (32) to be provided inside the secondary piston. Extra pressure can then be discharged during brake release (or brake pedal release) through the brake release duct (32) from the inside of the chamber (30) of the simulator towards the primary chamber (10) of the master cylinder.

8 Claims, 2 Drawing Sheets

ELECTRO-HYDRAULIC BRAKE CIRCUIT FOR A VEHICLE

The invention relates to an electro-hydraulic brake circuit for a vehicle, said brake circuit including a master cylinder. An object of the invention is to improve and to optimize vehicle braking action under driver control, in particular in the event that at least one element of the electro-hydraulic circuit malfunctions during sudden braking of the vehicle. The invention is more particularly applicable to the automobile field, but it may be used in other fields.

An electro-hydraulic circuit includes a displacement sensor for sensing displacement of a brake pedal, which sensor is placed on or in the vicinity of the brake pedal. During braking of the vehicle, the sensor detects displacement of the brake pedal and sends an order to a hydraulic pump. The hydraulic pump serves to suck up and to increase the pressure of a hydraulic liquid coming from a hydraulic liquid reservoir. The pressure generated by the pump then makes it possible to transmit a volume of liquid at a pressure necessary to brake the vehicle by means of a brake device.

A sensation of the brake pedal being depressed by the driver is then reproduced by means of a brake actuation simulator. The simulator is connected to a master cylinder.

The master cylinder is connected at one end to the brake pedal, and at the other end, to the brake device. In order to prevent the master cylinder from interfering with operation of the pump, a solenoid valve is placed between the master cylinder and the brake device. When displacement of the brake pedal is detected by the sensor, said solenoid valve can close, thereby reversibly disconnecting the master cylinder from the brake device.

Going from the brake pedal to the brake device, the master cylinder is provided with a primary chamber inside which a primary piston and a secondary piston slide. The primary and secondary chambers of the master cylinder are fed with hydraulic liquid by the hydraulic liquid reservoir. Said master cylinder is not used in vehicle braking proper. However, in the event that at least one element of the electro-hydraulic circuit malfunctions, said master cylinder brakes the vehicle. For example, such an element of the electro-hydraulic circuit may be the hydraulic pump, or the sensor for sensing displacement of the brake pedal.

The brake actuation simulator opens out via a duct into the primary chamber of the master cylinder. The simulator includes a chamber. Via said chamber, the simulator reproduces a sensation of braking for the driver by receiving a volume of liquid coming from the hydraulic liquid reservoir following displacement of the brake pedal.

In a situation in which one of the elements of the electro-hydraulic circuit no longer functions, it is still possible to brake the vehicle by means of the master cylinder. In such a situation, the solenoid valve between the master cylinder and the brake device remains open, and the simulator is reversibly disconnected from the master cylinder.

In order to disconnect the simulator from the master cylinder so as to prevent the volume of liquid from filling the chamber of the simulator, communication between the chamber of the simulator and the primary chamber is interrupted by means of an O-ring gasket. The O-ring gasket is situated on a circumference of the secondary piston, between the primary piston and the duct of the simulator. The O-ring gasket is disposed in a circular groove. The circular groove is provided around the circumference of the secondary piston. At rest, said gasket is disposed facing a circular setback provided in the bore of the master cylinder.

While the vehicle is being braked, and when the circuit is malfunctioning, the secondary piston of the master cylinder moves towards the brake device because the solenoid valve disposed between the master cylinder and the brake device is open. By moving, the secondary piston causes the O-ring gasket to be moved with it along the bore of the master cylinder. Since it has moved, the O-ring gasket is no longer facing the setback. The O-ring gasket is then compressed against the bore of the master cylinder and against the groove in the secondary piston. By being compressed, the O-ring gasket closes off communication between the primary chamber and the chamber of the simulator. The liquid no longer flows between the secondary piston of the master cylinder and the bore of the master cylinder in order to fill the chamber of the simulator. The volume of liquid can thus be compressed inside the primary chamber so as then to deliver pressure towards the brake device. The secondary piston also compresses a second volume of hydraulic liquid also serving to act in the brake device.

When sudden braking is performed and when the electro-hydraulic circuit is malfunctioning, the secondary piston moves suddenly and rapidly inside the master cylinder towards the brake device. A small volume of hydraulic liquid has time to penetrate between the secondary piston and the bore in the master cylinder before the gasket interrupts communication between the primary chamber and the chamber of the simulator. The hydraulic liquid penetrates into the chamber of the simulator more rapidly than during normal braking. That is why the liquid penetrating very rapidly generates a pressure wave that propagates from the chamber of the simulator towards the primary chamber.

At the time at which brake release (or brake pedal release) occurs, the chamber of the simulator and the primary chamber are still cut off from all communication. The primary piston tends to move faster than the secondary piston towards the brake pedal. The faster the primary piston moves away from the chamber of the simulator, the lower the pressure prevailing inside the primary piston becomes. Then, the secondary piston continues to move towards the brake pedal until the gasket comes to face the setback in the bore of the master cylinder. At that time, the pressure difference between the primary chamber and the chamber of the simulator is at its maximum. Pressure in the chamber of the simulator that is higher than the pressure in the primary chamber together with a pressure wave then tend to push the secondary piston towards the brake pedal. The gasket then tends to be sucked towards the lower-pressure primary chamber. The gasket moves away along an axis that is perpendicular to an axis of the secondary piston. Ultimately, the gasket can be extruded from its seat.

The next time the brakes are applied, if the gasket has been extruded from its seat, said gasket can no longer act as an isolator between the primary chamber and the chamber of the simulator. The liquid present in the primary chamber is then removed to the chamber of the simulator until said chamber is fully filled. Once the chamber of the simulator is fully filled, the primary piston can exert pressure on said volume. The time required for exerting pressure on the volume increases and the time the vehicle takes to react to braking also decreases. By reducing the reaction time for vehicle braking, braking is less effective. In order to make vehicle braking more effective, it is therefore in the interest of the driver for the gasket not to be extruded from its groove during braking, especially during sudden braking.

In order to prevent the gasket from being extruded from the groove in the secondary piston during brake release (or brake pedal release) resulting from sudden braking, it might be possible to reduce the depth of the setback in the bore of the master cylinder. In this way, the gasket would not have enough space to extrude from the groove at the time of brake release (or brake pedal release). However, that solution suffers from the drawback of allowing only a small quantity of fluid to penetrate from the primary chamber to the chamber of the simulator while the electro-hydraulic circuit is operating. That new parameter must be taken into consideration in order to give the driver the sensation of braking the vehicle via the brake pedal. That solution is costly and tedious to put in place because of the need to determine said new parameter.

In order to prevent the gasket from being extruded from the groove during brake release (or brake pedal release) resulting from sudden braking, it might also be possible to put in place a device serving to slow down the displacement of the primary piston as it moves towards the brake pedal. By slowing down the displacement of the primary piston towards the brake pedal during brake release (or brake pedal release), the pressure difference between the primary chamber and the chamber of the simulator would be smaller. The extra pressure in the chamber of the simulator that would be removed to the primary chamber when the gasket is situated facing the setback in the bore of the master cylinder would be lower. That smaller amount of extra pressure, removed at that time, would then be insufficient to urge the gasket to extrude from the groove. However, putting such a device in place would also be costly and tedious to achieve.

In order to prevent any extrusion of the gasket from its groove, after sudden braking in the event that an element of the circuit malfunctions, the invention makes it possible, on brake release (or brake pedal release), to remove extra pressure present in the chamber of the simulator. In order to remove said extra pressure present inside the chamber of the simulator, the invention makes provision to form at least one pressure relief duct inside the secondary piston. The pressure relief duct makes it possible to connect the chamber of the simulator to the primary chamber when the gasket interrupts communication between the chamber of the simulator and the primary chamber. The advantage of this solution is that it is simple and inexpensive to implement.

Preferably, a check valve is disposed inside the pressure relief duct so that the volume of liquid under pressure coming from the primary chamber cannot fill the chamber of the simulator during braking and so that said volume is directly compressible.

The invention thus makes it possible to improve and to optimize vehicle braking by ensuring that the gasket is not extruded from its seat during brake release (or brake pedal release), and by ensuring that braking is as immediate as possible in the event that an element of the electro-hydraulic circuit malfunctions.

The invention thus provides an electro-hydraulic brake circuit for a vehicle, said brake circuit including a master cylinder, said master cylinder being provided with a primary chamber and with a chamber of a brake actuation simulator, the primary chamber being closed at one end by a primary piston and isolated from the chamber of the simulator by an O-ring gasket placed in a peripheral groove on a circumference of a secondary piston, said brake circuit being characterized in that the secondary piston is provided with means making it possible to relieve pressure from the chamber of the simulator to the primary chamber.

The invention will be better understood on reading the following description and on examining the accompanying figures. The figures are given by way of indication and are in no way limiting to the invention. In the figures.

Figure 1:
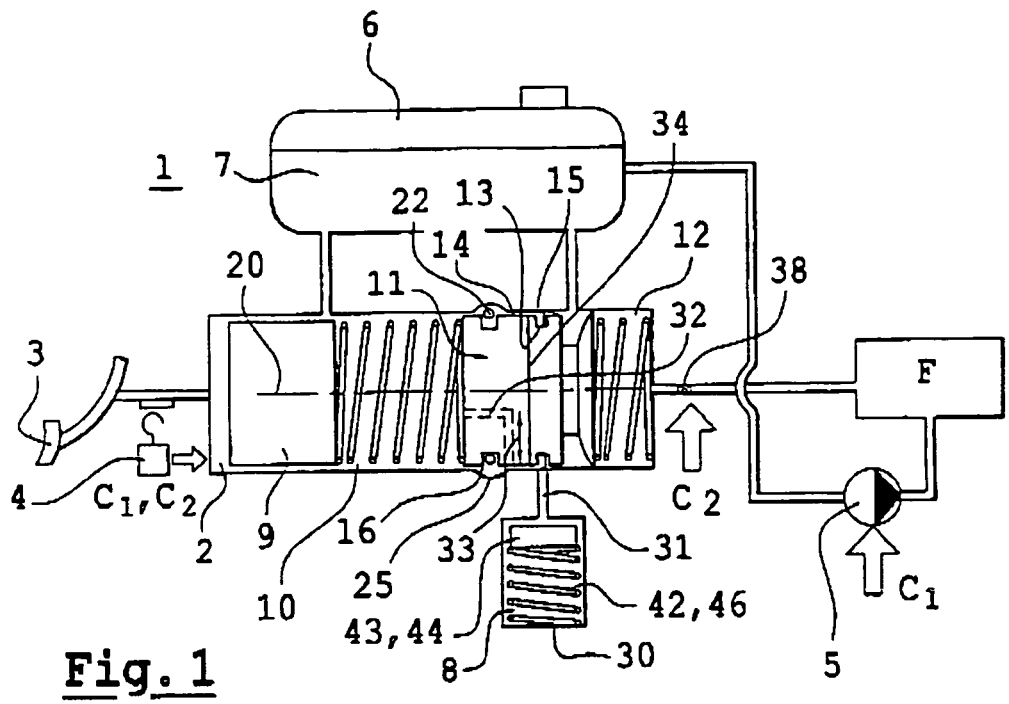
FIG. 1 is a diagrammatic view of an electro-hydraulic brake circuit of the invention for a vehicle.

FIG. 1 shows an electro-hydraulic brake circuit 1 of the invention for a vehicle, the brake circuit including a master cylinder 2. The electro-hydraulic brake circuit 1 also includes a brake pedal 3, a displacement sensor 4 for sensing displacement of the brake pedal 3 and for causing a hydraulic pump 5 to operate by issuing an order C1, a reservoir 6 of hydraulic liquid 7, a brake device F, and a brake actuation simulator 8 connected to the master cylinder 2.

Going from the brake pedal 3 to the brake device F, the master cylinder 2 has a primary piston 9 serving to slide inside a primary chamber 10, and a secondary piston 11 serving to slide inside a secondary chamber 12.

At one end of the secondary piston 11, namely its end facing towards the brake device F, a circular channel 13 is provided around the circumference 14 of the secondary piston 11. Inside said channel 13, a sealing washer 15 is disposed. The washer 15 seals the primary chamber 10 relative to the secondary chamber 12.

At the other end of the secondary piston 11, namely its end facing towards the brake pedal 3, a peripheral circular groove 16 is provided. Said groove 16 is shown in FIGS. 2a to 2d, and it comprises a bottom wall 17 and two side walls 18 and 19. The bottom wall 17 occupies a plane parallel to an axis 20 of the secondary piston 11. Each of the side walls 18, 19 occupies a plane that is perpendicular to the plane of the bottom wall 17 and that is perpendicular to the axis 20 of the secondary piston 11. The side wall 18 is situated closer to the primary chamber 10 while the side wall 19 is situated closer to the secondary chamber 12. The side wall 18 co-operates with a portion of the secondary piston 11 to form a projection or collar 21 extending radially outwards towards the outside of the master cylinder. The collar 21 has an elongate shape whose plane is perpendicular to the axis 20 of the secondary piston 11.

Figure 2A:
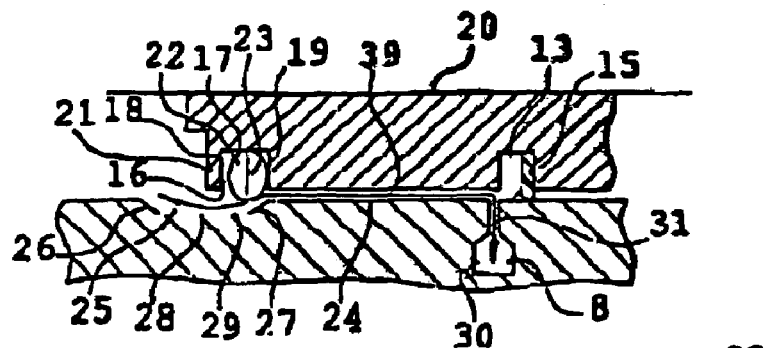
FIGS. 2a to 2d are diagrammatic views of how a secondary piston slides inside a master cylinder.

An O-ring gasket 22 is placed inside the groove 16, as shown in FIG. 2a. Said gasket may be of round cross-section with a diameter 23 such that the gasket 22 extends beyond the circumference 14 of the secondary piston 11 when it is placed inside the groove 16. The diameter 23 has a dimension such that the gasket 22 may be compressed slightly by a bore 24 in the master cylinder 2.

The bore 24 of the master cylinder is also provided with a setback 25 shown in FIG. 2a, and formed such that, at rest, the gasket 22 is situated facing the setback 25 and the gasket 22 is not compressed. The setback has a trapezoidal shape with a first bevel 26 and a second bevel 27 that are inclined in opposite directions. The bevel 26 is disposed closer to the brake pedal 3, while the bevel 27 is disposed closer to the secondary chamber 12. The two bevels 26 and 27 are interconnected via an interconnecting face 28. The interconnecting face has a plane parallel to the axis 20 of the secondary piston 11. At rest, the gasket 22 is disposed such that a space 29 (FIG. 2a) is present between the gasket 22 and the interconnecting face 28 of the setback 25.

The simulator 8 has a chamber 30 connected to the primary chamber 10 of the master cylinder 2 via a duct 31 placed facing the secondary piston 11 (FIG. 1). The duct 31 may open out between the channel 13 and the groove 16. The duct may also open out where the channel 13 is situated, as shown in FIG. 1.

In the invention, the secondary piston 11 is provided with means making it possible for pressure to be relieved from the chamber of the simulator 30 into the primary chamber 10. Said means making it possible for pressure to be relieved from the chamber of the simulator into the primary chamber comprise at least one pressure relief duct 32. The pressure relief duct 32 is provided in the secondary piston 11. Said pressure relief duct 32 is shown in FIG. 1 by dashed lines. The pressure relief duct 32 is provided in the secondary piston 11 such that it opens out into the primary chamber 10 and facing the bore 24 in the master cylinder 2. The pressure relief duct 32 connects the primary chamber 10 to the chamber 30 of the simulator 8. In particular, the pressure relief duct 32 connects the primary chamber 10 to the chamber 30 when the gasket 22 is compressed between the groove 16 and the bore 24 in the master cylinder.

Figure 3:
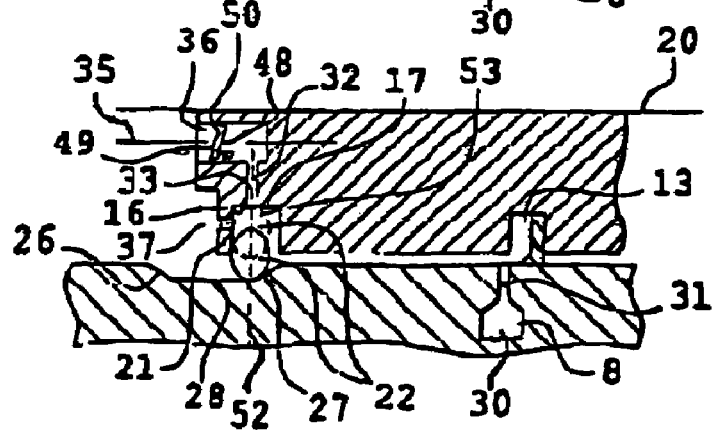
FIG. 3 is a diagrammatic view of a secondary piston of the invention.

However, the duct 32 may also by-pass the gasket 22, as shown in FIG. 3. In particular, as shown in FIG. 3, the pressure relief duct 32 is provided starting from the bottom-wall 17 of the groove 16. The pressure relief duct 32 is bored over at least a portion 33 (FIG. 3) of a diameter 34 (FIG. 1) of the secondary piston 11 starting from the bottom wall 17 of the groove 16. For example, the portion 33 may be bored over a length corresponding to the distance between the end-wall 17 of the groove 16 and the axis 20 of the secondary piston 11. But the portion 33 may also be bored over a distance lying between the end-wall 17 of the groove 16 and the axis 20 of the secondary piston 11. For example, and as shown in FIG. 3, the pressure-relief duct 32 may be formed starting from the bottom wall 17 of the groove 16 to another axis 35 parallel to the axis 20. Then the pressure relief duct 32 may open out from the same portion 33 into the primary chamber 10 via an axial hole 36 that is axial to the secondary piston 11. In particular, the pressure relief duct 32 may open out via the hole 36 along the axis 20 of the secondary piston 11. Or else, said pressure relief duct 32 may open out via the hole 36 parallel to the axis 20 of the secondary piston 11 by extending along the axis 35 of the secondary piston 11, as shown in FIG. 3.

In a variant, the collar 21 may also be provided with another pressure relief duct 37, as shown in FIG. 3. Said other pressure relief duct 37 may open out parallel to the axis 20 of the secondary piston 11 into the primary chamber 10.

During braking and while the electro-hydraulic circuit 1 is operating normally (as shown in FIG. 1), the displacement sensor 4 for sensing displacement of the brake pedal 3 sends an order C1 to the pump 5 when displacement of the brake pedal 3 is detected. The order C1 causes hydraulic liquid to be sucked from the reservoir 6 by the pump 5. Once it has been put under pressure by the pump 5, said liquid is then transmitted to the brake device F in order to brake the vehicle. The displacement sensor 4 for sensing displacement of the brake pedal 3 also sends another order C2 at the same time. Said other order C2 causes a solenoid valve 38 to close as shown in FIG. 1. The solenoid valve 38 is situated downstream from the master cylinder 2, between the master cylinder and the brake device F. Closing the solenoid valve 38 interrupts communication between the master cylinder 2 and the brake device F.

A volume of liquid contained in the primary chamber 10 of the master cylinder is also displaced. The purpose of displacing said volume of liquid is to reproduce a sensation of braking for the driver when said driver depresses the brake pedal 3 with the foot. The volume is displaced by means of the primary piston 9 towards the chamber 30 of the brake actuation simulator 8. The liquid flows between the gasket 22 and the bore 24 in the master cylinder. In particular, the liquid flows through the space 29 between the gasket 22 and the setback 25, as shown in FIG. 2*a*. Then the liquid penetrates between the secondary piston 11 and the bore 24 in the master cylinder, and flows into the chamber 30 of the simulator 8 via the duct 31. The liquid flowing towards the chamber 30 of the simulator is shown by an arrow 39 in FIG. 2*a*.

Figure 4:
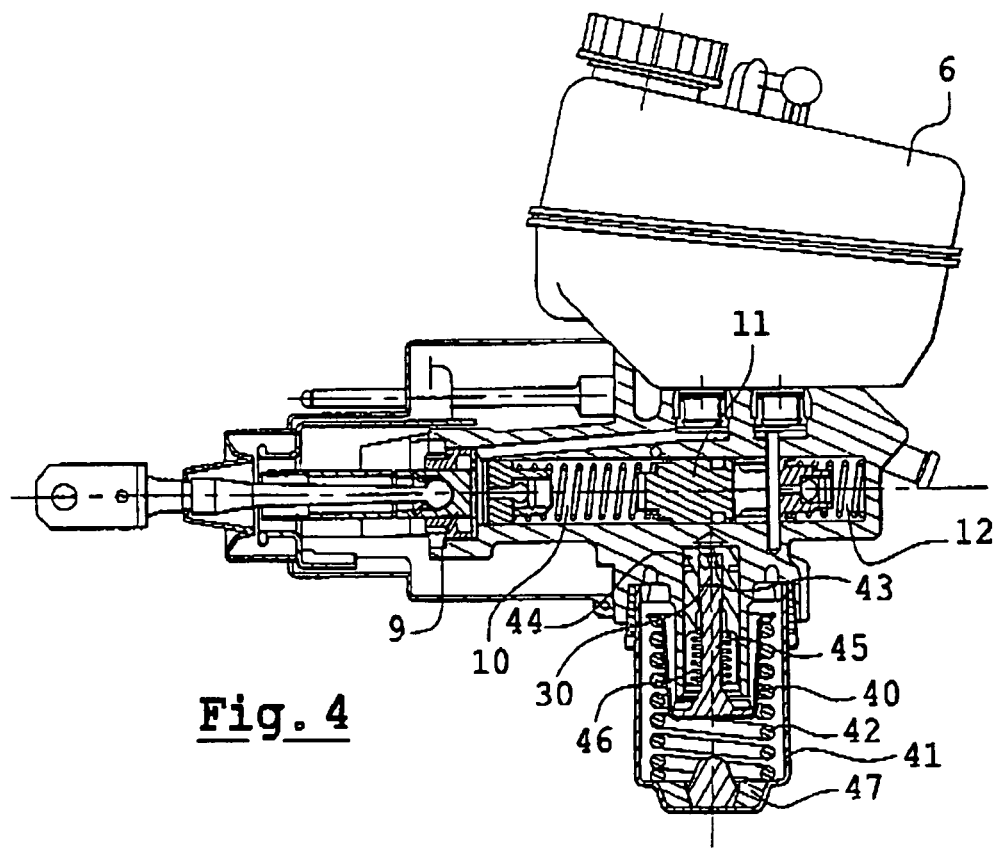
FIG. 4 is a longitudinal section view through a master cylinder.

The simulator generates a sensation of the brake pedal being depressed by gradually accepting with a certain amount of resistance the volume of liquid in the chamber 30. For this purpose, the simulator is provided with a first receptacle 40 contained in a second receptacle 41 (FIG. 4). The first receptacle 40 is suspended inside the second receptacle 41 by a first spring 42. The first receptacle 40 includes a chamber 30, a first actuating piston 43 and a second actuating piston 44. After liquid has entered the chamber 30, the first piston 43 is firstly compressed against a base 45. The base 45 is fixed securely to the first receptacle 40. Once the chamber 30 has been filled with liquid and once the first piston 43 is in contact with the base 45, the second actuating piston 44 is then compressed against the first piston 43 of the base 45. Since the second piston 44 is mounted on a second spring 46, said second piston 44 moves until it is pressed against the first piston 43. Then the pressure of the liquid urges the first receptacle 40 to move towards an end wall 47 of the second receptacle 41. The pistons 43 and 44 being caused to move in succession by filling the chamber 30 with a volume of liquid, and the first receptacle 40 moving towards the end wall 47 of the second receptacle 41 then give rise to a sensation of resistance when the driver depresses the brake pedal 3.

When at least one of the elements (e.g. the hydraulic pump 5) of the electro-hydraulic circuit ceases to operate, the master cylinder 2 can provide backup braking for the vehicle. In which case, after the brake pedal 3 has been depressed during braking, the solenoid valve 38 remains in an open position. In this position, the solenoid valve 38 makes it possible for the master cylinder to be connected to the brake device F. The liquid contained in the primary chamber 10 of the master cylinder 2 can then be compressed by means of the primary piston 9 advancing against the secondary piston 11 towards the brake device F, and then be discharged via a duct (not shown) leading to the brake device F (FIG. 1).

Figure 2B:
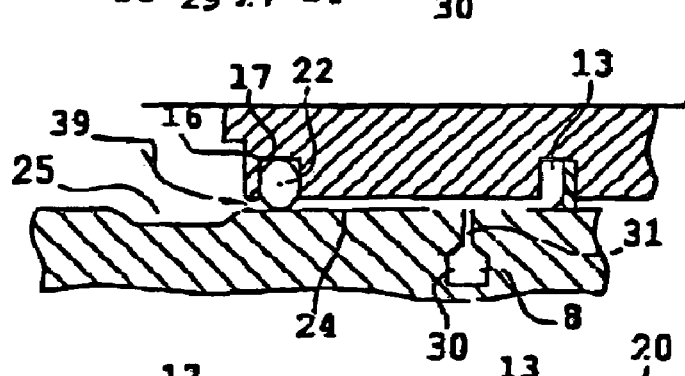

In order to prevent the liquid from penetrating into the chamber 30 of the simulator, communication between the primary chamber 10 and the chamber 30 of the simulator is momentarily interrupted by means of the gasket 22. The effect of interrupting communication between the primary chamber 10 and the chamber 30 of the simulator 8 during braking and while an element of the circuit 1 is malfunctioning is shown in FIGS. 2*a* to 2*b*. The liquid being compressed against the secondary piston 11 causes the secondary piston 11 to move. By moving, the secondary piston 11 also causes the O-ring gasket 22 to move (FIG. 2*b*). The gasket is thus situated outside the setback 25. Then it is compressed between the bore 24 in the master cylinder and the groove 16. In the invention, since the gasket is leaktight and elastic, said gasket 22 interrupts communication between the primary chamber 10 and the chamber 30 of the simulator. The liquid being prevented from flowing towards the chamber 30 of the simulator 8 is indicated by the arrow 39 in FIG. 2*b*.

In the invention, check means 48 may be installed inside the pressure relief duct 32 in order to prevent the liquid from penetrating into the chamber 30 of the simulator via the pressure relief duct 32 during braking, as shown in FIG. 3. For example, a check valve 48 may be installed inside the pressure relief duct 32, as shown in FIG. 3. The valve 48 may comprise a stationary first rod 49 and a flexible second rod 50. The two rods 49 and 50 are diametrically inserted inside the pressure-relief duct 32. They are inserted perpendicularly to the axis 20 of the secondary piston 11. The rod 50 is longer than the rod 49 and is situated between the rod 49 and the primary chamber 10. Thus, the liquid can penetrate into the pressure relief duct 32 only from the chamber of the simulator 30 towards the primary chamber 10.

If the valve 48 is not installed, the same result is obtained by closing off the pressure relief duct 32 with the wall of the O-ring gasket 22, whose elasticity is adapted accordingly. The pressure relief duct 32 being closed off by the wall of the gasket 22 is shown in dashed lines in FIG. 3.

During brake release (or brake pedal release) resulting from normal braking, the secondary piston 11 slides along the bore 24 in the master cylinder towards the brake pedal 3 until the gasket is situated facing the setback 25.

Figure 2C:
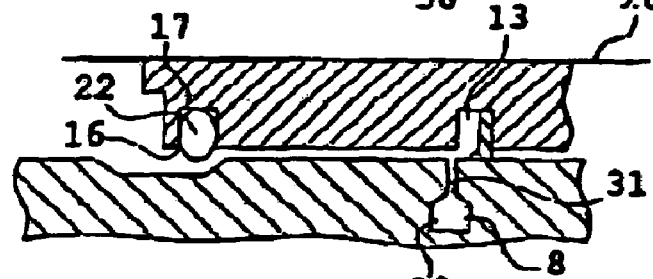
Figure 2D:
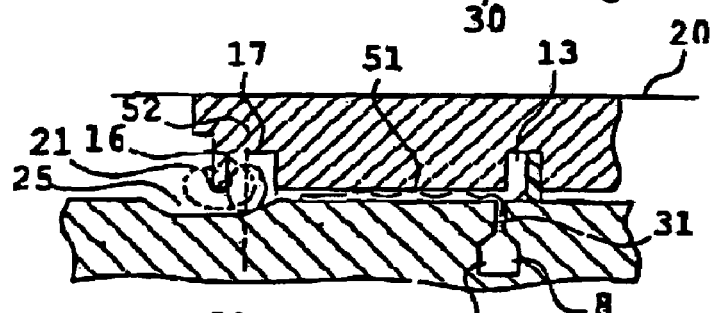

In the event of sudden braking, the primary piston 9 compresses the liquid against the secondary piston 11 towards the brake device F. Because of the rapidity of braking, a small volume of liquid might have penetrated into the chamber 30 of the simulator 8 by flowing through the space 29 and by flowing between the bore 24 in the master cylinder and the secondary piston 11 before the secondary piston 11 isolates the primary chamber 10 from the chamber 30 of the simulator 8 via the gasket 22 (FIGS. 2*c* and 2*d*). The volume of liquid generates a pressure wave 51 (FIG. 2*d*). Said pressure wave 51 can propagate from the chamber 30 of the simulator 8 towards the primary chamber 10.

During brake release (or brake pedal release) resulting from sudden braking, the primary piston 9 moves faster than the secondary piston 11 towards the brake pedal 3. Suction is then established between the primary chamber 10 and the chamber of the simulator 30. The pressure prevailing inside the primary chamber 10 is lower than the pressure prevailing inside the chamber 30. The inside of the chamber 30 then has extra pressure compared with the inside of the primary chamber 10. The extra pressure is even greater since the gasket 22 slows down the movement of the secondary piston 11 towards the brake pedal 3 while the primary piston 9 continues to move towards the brake pedal 3.

Thus, the extra pressure prevailing inside the chamber 30 of the simulator and the pressure wave 51 present inside the simulator tend to extrude the gasket 22 from the groove 16 when the gasket is situated facing the setback 25 as shown in FIG. 2*d*. When the gasket is situated facing the setback 25, the gasket 22 tends to be sucked towards the lower-pressure primary chamber 10. The high pressure prevailing inside the chamber 30 of the simulator and the pressure wave 51 urge the gasket to move away along an axis 52 perpendicular to the axis 20 of the secondary piston 11 and coinciding with the diameter 23. The gasket is pressed against the bevel 27 and the collar 21. Then the gasket tends to wrap around the collar 21 and finally to become dislodged from the groove 16. The curvature of the gasket 21 resulting from the thrust force exerted by the pressure 51 and by the extra pressure prevailing in the chamber 30 of the simulator is shown in dashed lines in FIG. 2*d*.

However, by means of the invention, the gasket 22 can no longer be extruded from the groove 16. The extra pressure is reduced by the presence of the pressure relief duct 32 inside the secondary piston 11 (FIG. 3). The pressure relief duct 32 makes it possible for the extra pressure and the pressure wave 51 to be discharged from the chamber 30 of the simulator by connecting the chamber of the simulator 30 to the primary chamber 10. Such extra pressure discharge can take place via the pressure relief duct 32 by-passing the gasket 22 (FIG. 3). Discharging the extra pressure is then made even easier since the primary piston 9 tends, as it moves towards the brake pedal 3, to suck out the contents of the chamber of the simulator 30.

Such extra pressure discharge is also made even easier since the gasket 22 moves away from the bottom wall 17 of the groove by suction when it is situated facing the setback 25. By moving away from the bottom wall 17 of the groove 16, the gasket 22 then opens up a space 53 facilitating discharge of said extra pressure and of the pressure wave 51.

The invention claimed is:

1. An electro-hydraulic brake circuit (1) for a vehicle, said brake circuit including a master cylinder (2), said master cylinder being provided with a primary chamber (10) and with a chamber (30) of a brake actuation simulator (8), the primary chamber (10) being closed at one end by a primary piston (9) and isolated from the chamber (30) of the simulator by an O-ring gasket (22) placed in a peripheral groove (16) on a circumference (14) of a secondary piston (11), said brake circuit being characterized in that the secondary piston (11) is provided with means making it possible to relieve pressure from the chamber of the simulator to the primary chamber, said pressure relief means having at least one pressure relief duct (32) located in the secondary piston (11) that starts at the peripheral groove (16) and by-passes the gasket (22).

2. The circuit (1) according to claim 1, characterized in that the pressure relief duct (32) is provided starting from a bottom wall (17) of the groove (16), the plane of which bottom wall is parallel to an axis (20) of the secondary piston (11).

3. The circuit (1) according to claim 2, characterized in that the pressure relief duct (32) is provided starting from the bottom wall (17) of the groove (16), passes through at least a portion (33) of a diameter (34) of the secondary piston (11) and opens out from said portion via a hole (36) that is axial to the secondary piston into the primary chamber (10).

4. The circuit (1) according to claim 3, characterized in that the pressure relief duct (32) opens out via the hole (36) perpendicularly to the portion (33) of a diameter (34) of the secondary piston (11).

5. The circuit (1) according to claim 4, characterized in that the pressure relief duct (32) is provided starting from a collar (21) of the groove (16), the plane of which collar is perpendicular to an axis (20) of the secondary piston (11).

6. The circuit (1) according to claim 5, characterized in that the gasket (22) is elastic and leaktight.

7. The circuit (1) according to claim 6, characterized in that the pressure relief duct (32) is provided with check means (48) preventing fluid from flowing from the primary chamber (10) to the chamber of the simulator (30).

8. The circuit (1) according to claim 7, characterized in that the means (48) are constituted by a check valve (48).

* * * * *